United States Patent
Kumacheva (10) Patent No.: US 7,033,524 B2
(45) Date of Patent: Apr. 25, 2006

(54) POLYMER-BASED NANOCOMPOSITE MATERIALS AND METHODS OF PRODUCTION THEREOF

(76) Inventor: Eugenia Kumacheva, 382 Ellerslie Avenue, Toronto (CA) M2R 1B9

( * ) Notice: Subject to any disclaimer, the term of this patent is extended or adjusted under 35 U.S.C. 154(b) by 326 days.

(21) Appl. No.: 10/204,539

(22) PCT Filed: Feb. 22, 2001

(86) PCT No.: PCT/CA01/00206

§ 371 (c)(1),
(2), (4) Date: Oct. 24, 2002

(87) PCT Pub. No.: WO01/62830

PCT Pub. Date: Aug. 30, 2001

(65) Prior Publication Data

US 2003/0136946 A1    Jul. 24, 2003

Related U.S. Application Data

(60) Provisional application No. 60/183,749, filed on Feb. 22, 2000.

(51) Int. Cl.
*H01B 1/20* (2006.01)
*B32B 5/16* (2006.01)

(52) U.S. Cl. .................. 252/500; 252/511; 252/514; 252/518.1; 428/327; 428/323

(58) Field of Classification Search ............. 252/500, 252/511, 514, 518.1; 428/323, 327; 430/270.14
See application file for complete search history.

(56) References Cited

U.S. PATENT DOCUMENTS

| 5,126,226 | A | * | 6/1992 | Frohlich et al. ............ 430/257 |
| 5,540,951 | A | | 7/1996 | Nagayama et al. |
| 5,705,222 | A | | 1/1998 | Somasundaran et al. |
| 5,952,131 | A | * | 9/1999 | Kumacheva et al. .......... 430/21 |
| 5,965,233 | A | * | 10/1999 | Tojo et al. .................. 428/141 |

FOREIGN PATENT DOCUMENTS

| WO | 9941299 | 8/1999 |
| WO | 9947253 | 9/1999 |

OTHER PUBLICATIONS

Caruso et al, "Electrostatic Self-Assembly of Silica Nanoparticle-Polyelectrolyte Multilayers on Polystyrene Latex Particles," J. Am. Chem. Soc., 1998, 120, 8523-8524.*

Kumacheva et al, "Three-Dimensional Arrays in Polymer Nanocomposites," Adv. mater. 1999, 11(3), pp 231-234.*

(Continued)

*Primary Examiner*—Mark Kopec
*Assistant Examiner*—Kallambella Vijayakumar
(74) *Attorney, Agent, or Firm*—Lynn C. Schumacher; Hill & Schumacher (57) ABSTRACT

Polymeric-based nanocomposites with different structures using core-shell particles. The present invention provides a method for producing polymer-based core-shell nanocomposite structures. The nanocomposite materials may be produced with voids in them which may be partially or completely filled with other materials. The core and shell materials may be formed from multicomponent materials, in the case of the cores these may be for example multiple oxides, semiconductors and in the case of the polymer shell material multiple polymers in blends or copolymers.

40 Claims, 12 Drawing Sheets

CORE-SHELL PARTICLES WITH THIN SHELLS

OTHER PUBLICATIONS

Carbon Structures with Three-Dimensional Periodicity at Optical Wavelengths, Anvar A. Zakhido, et al., Science Magazine 1998 pps. 1-9.

Synthesis of Macroporous Minerals with Highly Ordered Three-Dimensional Arrays of Spheroidal Voids, Brian T. Holland et al., Science Magazine 1998, pps 1-8.

Preparation of Photonic Crystals Made of Air Spheres in Titania, Judith E.G.J. Wijnhoven et al., Science Magazine 1998, pps 1-6.

Thin-Film Micropatterning Using Polymer Microspheres, F. Lenzmann et al., Institute of Materials Research, McMaster University, Hamilton, Ontario, Canada Chem Mater 1994, 6 156-159.

Polymerized colloidal crystal hydrogel films as intelligent chemical sensing materials, John H. Holtz et al., Nature 1997, 829-234.

Three-Dimensional Arrays in Polymer Nanocomposites by Eugenia Kurnacheva et al., Adv Mater 1999, 11 No. 3 pps 231-234.

* cited by examiner

CORE-SHELL PARTICLES WITH SUFFICIENTLY THICK SHELLS

FIG. 1b
(PRIOR ART)

CORE-SHELL PARTICLES WITH THIN SHELLS

Polypyrrole covered with PBMA particles

PMMA: $\xi = -72.5$ mV
Polypyrrole: $\xi = +15.4$ mV
Poly(methyl methacrylate) is coated with polypyrrole particles

Figure 9 a) SiO₂ cores 485nm    b) 5%    c) 10% d) 12.5%    e) 15%    f) 20%

Structure of $SiO_2$–$TiO_2$ particles as a function of the weight concentration of titanyl sulfate in dispersion

POLYMER-BASED NANOCOMPOSITE MATERIALS AND METHODS OF PRODUCTION THEREOF

CROSS REFERENCE TO RELATED APPLICATION

This patent application claims benefit of U.S. Provisional Patent Application Ser. No. 60/182,749 filed on Feb. 22, 2000.

FIELD OF THE INVENTION

The present invention relates to polymer based nanocomposite materials and their methods of production.

BACKGROUND OF THE INVENTION

In the recent decade, polymer-based nanocomposite materials have attracted a great deal of attention because of their applications in various high-tech applications, such as micromechanical devices, memory storage media, chemical and biochemical sensors, display devices, and photonic band-gap materials. Generally, colloid crystals are employed either as templates for producing ordered 2D or 3D structures, (Holland, B T, Blanford, C F, Stein A. *Science* 1998, 281, 538; Zahidov, A. A. et al. *Science* 1998, 282, 897; Wijnhoven, J. E. G., Vos, W. L. *Science* 1998, 281, 802; Lenzmann, F., Li, K., Kitai, A. H., Stöver Chem. Mater. 1994, 6, 156) for example, in the fabrication of photonic bang gap materials or on their own right as chemical sensors (Holtz, J. H., Asher, S. A. *Nature* 1997, 389, 829) and devices for memory storage (Kumacheva, E.; O. Kalinina; Lilge, L. *Adv. Mat.* 1999, 11, 231).

Figure 1A:
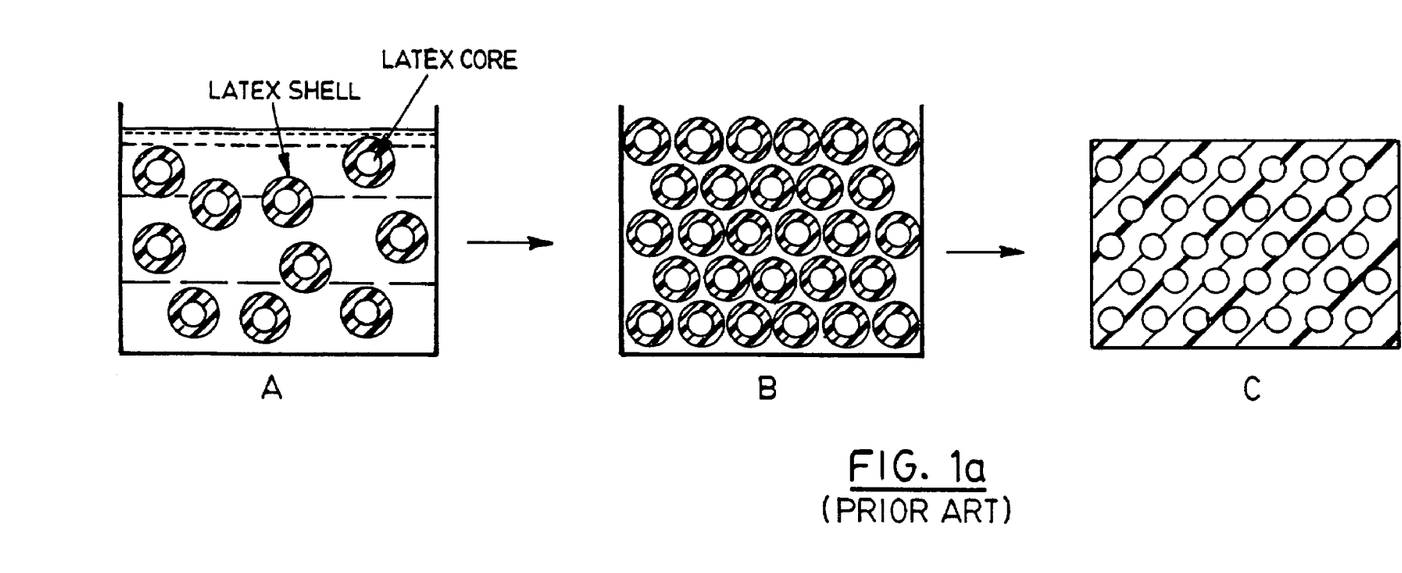
FIG. 1a is a diagrammatic representation of a Prior Art method of formation of polymer-based nanocomposite material, stage A: synthesis of the core-shell particles with hard cores and soft shells, stage B: assembly of particles in a 1D, 2D, or 3D close-packed structure, stage C: heat treatment of the particle compact that leads to flow of soft shells and formation of a nanocomposite polymer.
Figure 1B:
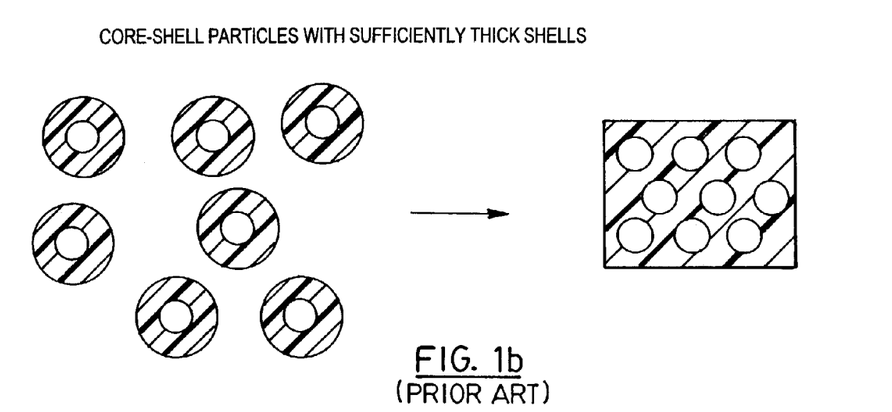
FIG. 1b is a diagrammatic representation of a portion of steps B and C of FIG. 1a the prior art method of formation of polymer-based nanocomposite material using a thick polymeric shell that ensures a continuous void-free core-shell composite material.

Recently, a new approach to producing 3D polymer-based nanocomposites has been proposed. This method employs latex particles composed of hard cores and somewhat softer shells (Kalinina, O.; Kumacheva. E. *Macromolecules* 1999, 32, 4122). U.S. Pat. No. 5,952,131 to Kumacheva et al., the contents of which are incorporated herein by reference, discloses a material having a matrix composed of particles having a core resin and a shell resin. FIG. 1a demonstrates the stages in fabrication of such a nanocomposite material from core-shell latex particles. Core-shell latex particles, composed of hard cores and somewhat softer shells, are synthesized at step A. The particles are packed in a close packed array, at step B, and annealed at step C at the temperature that is above the glass transition temperature, $T_g$, of the shell-forming polymer (SFP) and below the $T_g$ of the core-forming polymer (CFP). As a result, the latex shells flow and form a matrix, whereas the rigid cores form a disperse phase.

With this approach, it is known to incorporate functional components into the CFP. When the diffusion of the functional component between the cores and the shells is sufficiently suppressed, nanocomposite materials with a periodic modulation in composition are produced. It is also known to prepare materials with a direct structure in which fluorescent core particles are embedded into an optically inert matrix.

It would be very advantageous to be able to produce a nanocomposite template array that would enable one to incorporate a wide array of materials, either organic or inorganic based materials into the template and to facilitate a method of rapidly and economically producing a broad range of polymer-based nanocomposites with periodic modulations in composition and properties. Such materials would have applications in memory storage, photonic crystals, micromechanical actuators, devices for telecommunications, interference and high-refractive index coatings, bio- and chemical sensors.

SUMMARY OF THE INVENTION

The present invention provides a method for producing polymer-based core-shell nanocomposite structures with numerous combinations of properties of the constituent particles and the matrix.

The present invention provides polymer-based nanocomposites obtained by synthesizing core-shell particles with organic or inorganic cores and polymeric shells; arranging them in one-, two-, or three-dimensional arrays, and annealing them at the temperature at which polymeric shells flow.

The present invention provides a nanocomposite material, comprising;

a plurality of rigid core particles embedded in a polymeric material and including air voids located in said polymeric material.

The rigid core particles and the soft polymeric shells may have a single-component or a multicomponent structure providing a route to multicomponent nanocomposite materials.

The present invention also provides a nanocomposite material, comprising;

a plurality of rigid core particles embedded in a polymeric material, said rigid core particles comprising multicomponent organic or inorganic materials.

The present invention also demonstrates that the ratio between the dimensions of the particle cores and shells can be manipulated to produce a material containing voids that may be filled with various species.

In another aspect of the present invention there is provided a method of synthesizing a nanocomposite material, comprising;

coating a plurality of rigid substantially spherical core particles with a polymeric shell material, said core particles having a radius $r_c$ and said polymeric shell material coating said core particles having a thickness $I_s$, selecting the radius $r_c$ of the rigid spherical core particles and the shell thickness $I_s$ to satisfy $0.05 < I_s r_c < 0.2$, said polymeric material having a glass transition temperature above room temperature, the rigid core particles having softening temperature greater than a softening temperature of said polymeric material such that upon annealing the polymeric material softens and flows while the rigid core remains solid;

producing one of a one-dimensional, two-dimensional and three-dimensional array with the coated rigid core particles; and heating said array above the softening temperature of the polymeric material at which it flows to form a continuous phase having air voids dispersed therethrough.

BRIEF DESCRIPTION OF THE DRAWINGS

The method of producing polymer-based core-shell nanocomposite structures according to the present invention, will now be described, by way of example only, reference being had to the accompanying drawings, in which.

DETAILED DESCRIPTION OF THE INVENTION

The present invention describes a process for producing polymer-based core-shell nanocomposite structures. Particularly, the invention provides core-shell nanocomposite structures having periodic voids dispersed throughout the structure. The invention also provides core-shell nanocomposite structures in which the cores comprise multi-component constituents in which the differing constituents may cover the ambit of both organic and inorganic materials and these structures are produced both with and without periodic voids dispersed throughout the material.

The schematics of the approach for growing a polymer-based nanocomposite with a continuous core-shell structure is shown in FIG 1a. As discussed in the introduction, stage A involves the synthesis of the core-shell latex particles that consist of a hard core and a somewhat softer shell. The materials chosen for the synthesis of the core and shell materials must satisfy two important requirements. First, the temperature of softening of the core-forming material (CFM) and the shell-forming polymer (SFM) should be such that upon annealing the SFM softens and flows while the CFM remains intact. Second, the shell-forming material must have the glass transition temperature well above the room temperature. Any possible diffusion of species between the core and the shell during synthesis or during annealing should be suppressed to give a distinct or abrupt well defined boundary between the core and shell.

Several non-limiting and purely exemplary examples are given below to demonstrate different combinations of materials incorporated into the core- or shell-forming polymers.

EXAMPLE 1

Figure 2:
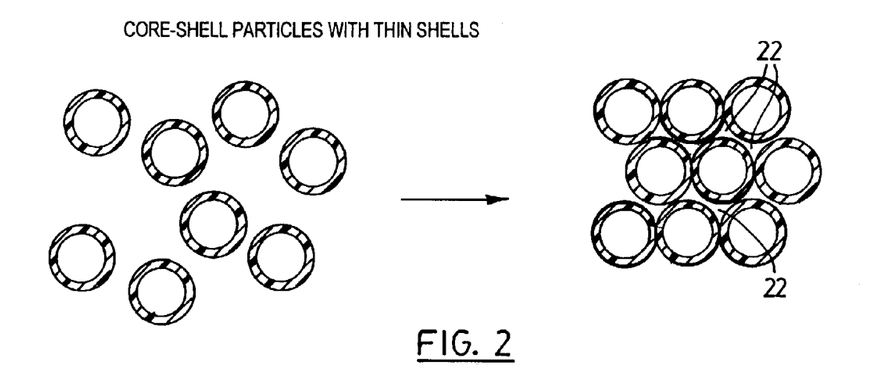
FIG. 2 shows the principle of the preparation of a nanocomposite material containing voids in accordance with the present invention.
Figure 3:
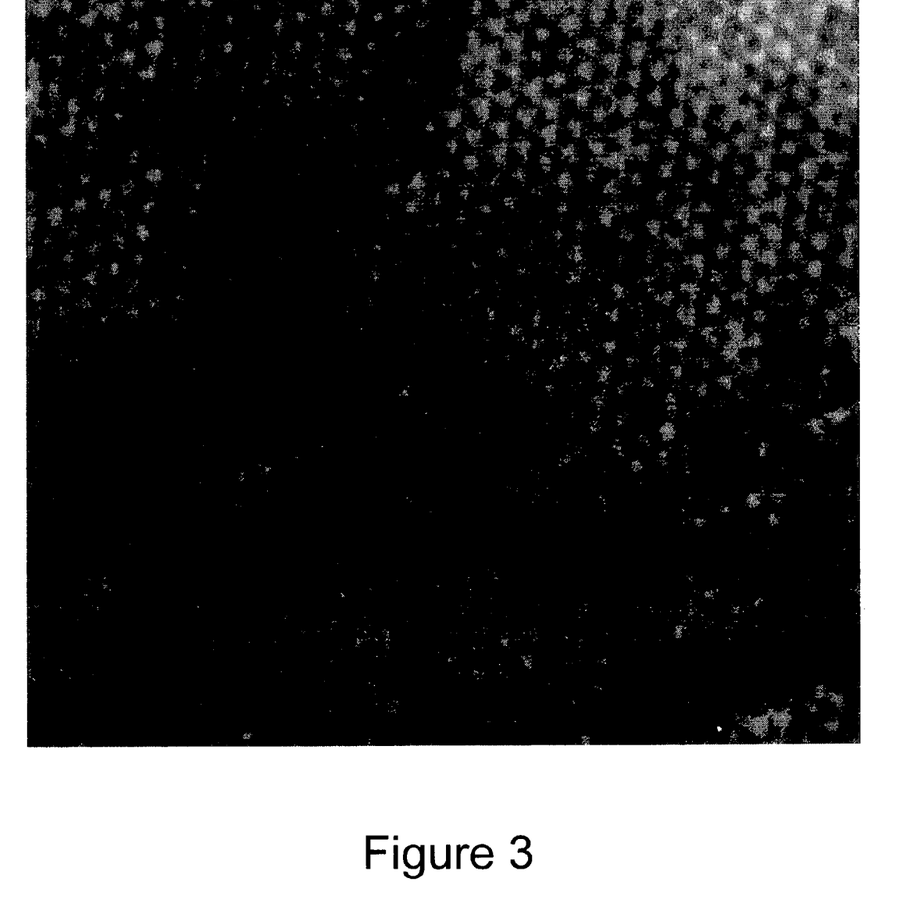
FIG. 3 shows a laser confocal fluorescent microscopy image of the nanocomposite material containing voids, the scale bar is 2 μm, the size of the fluorescent poly (methyl methacrylate) core particles is 0.5 μm, the thickness of the poly (methyl methacrylate)—poly (butyl methacrylate) shells is 0.08 μm.

Formation of the Nanocomposite Material with Voids Available for Further Incorporation of Functional Species The principle of tuning of the structure of the nanocomposite material to incorporate periodic voids is shown in FIG. 2. The ratios between the volume fractions of the CFM and the SFM leading to formation of the nanocomposite material with voids is shown in Table 1 in a shadowed area while the fractions outside of the shadowed section of the Table give a continuous structure. To form a homogeneous matrix the ratio between the thickness of the shell, $I_s$, and the radius of the core ($r_c$) should exceed 0.2, i.e., $I_s/r_c<0.2$. When $0.05<I_s/r_c<0.2$, the amount of the CFM is not sufficient to form a continuous matrix and small voids are left between particles. The recipe of one embodiment of a synthesis of the core-shell particles with fluorescent polymeric cores and optically inert polymeric shells leading to this type of structure is given in Table 2. It is evident from FIG. 2 that the composite structure comprises voids 22 periodically dispersed throughout the material. FIG. 3 shows a laser confocal fluorescent microscopy image of a nanocomposite material containing voids in which both the core and shell are polymer materials. Fluorescent cores appear as bright domains, whereas black domains correspond to air voids available for filing them with different polymer or inorganic materials using electrochemical approaches, vacuum deposition, or capillary infiltration with liquid phases. The size of the fluorescent poly (methyl methacrylate) core particles is 0.5 μm, the thickness of the poly (methyl methacrylate)-poly (butyl methacrylate) shells is 0.08 μm. The scale bar is 2 μm.

The cores may be formed of organic. e.g. polymeric materials or inorganic materials including oxides such as $TiO_2$, $SiO_2$ and the like. At the assembly state analogous to stage B in FIG. 1a (but with the appropriate core-shell ratios to give periodic voids) the core-shell particles are arranged in a one-dimensional, two-dimensional, or three-dimensional array by using sedimentation, electrodeposition or centrifugation. Fabrication of the composite material is completed by annealing of the dry compact (analogous to stage C in FIG. 1a). At this stage, the composite material is heated above the softening point of the SFM, at which it flows and fills partly or completely voids between the core particles and forms a continuous phase. In this approach, the SFM should be such that the shells possess enough elasticity to act as a barrier to prevent the aggregation of the cores.

The present method disclosed herein provides several levels of control of the structure and function of the nanocomposite. First, the diameters of the cores and the thicknesses of the shells may be varied and controlled leading to the variation in particle size and number density in the nanocomposite material. Secondly, the shape of the core-shell particles i.e. spherical shape versus a rod-like shape, can be manipulated at stage A. Third, the suggested approach provides several types of morphologies of the ultimate composite material. When the shells are sufficiently thick, the SFM fills gaps between the core particles, i.e., forms a continuous matrix. For thin shells, the rigid particles are just "glued" together by the SFM. In this way composite materials are formed, in which small voids between particles can be filled with another functional material. Finally, the composition of the CFM and the SFM can be varied and controlled in a variety of ways, several of which will be described below.

The core-shell particles can be monodispersed or polydispersed depending on a desired application of the nanocomposite material. To form nanocomposites with ordered structures, the core particles preferably are monodisperse, the shells are preferably uniform in thickness, and the entire core-shell particles are monodispersed. The CFM may be either a single or multicomponent material. In the multicomponent cores, several species can form distinct layers or can be mixed to form a homogeneous phase. The multicomponent materials may be inorganic based materials e.g. oxides, or multicomponent organic materials, e.g. polymer mixtures, blends and the like.

The structure of the nanostructured material with necks between monodispersed colloid particles and voids between the particles is similar to the structure of templates used for producing photonic band gap materials, (REF) but has a much better processability (e.g. it can be polished) and resistance to cracking. Due to the presence of voids and ordered structure the material appears as highly irridiscent, and can be used as diffraction coating or free-standing film. Alternatively, the voids may be filled with photosensitive materials such as dyes or chromophores. For example, a monomer covalently labeled or mixed with a fluorescent dye with the absorption peak similar or different then the absorption peaks of the dye(s) incorporated in the core and/or core-forming polymer may be used for several applications including data storage media. Under imaging of the structure different material morphologies will be observed for different wavelengths of irradiation. Local photobleaching of a particular dye in the specific lateral or vertical plane will enable one to incorporate a secret code in thin coating for security needs.

Alternatively, inorganic, e.g. semiconductor particles may be incorporated into the voids using capillary flow, infiltration or vacuum deposition. First, upon dissolution of the particles, octahedral nanostructures will be obtained which have a very high control over their dimensions and monodispersity. Second infiltration of a monomer or a polymer mixed with inorganic material, having nonlinear properties will lead to the periodic modulation of optical properties of the material.

EXAMPLE 2

Figure 4:
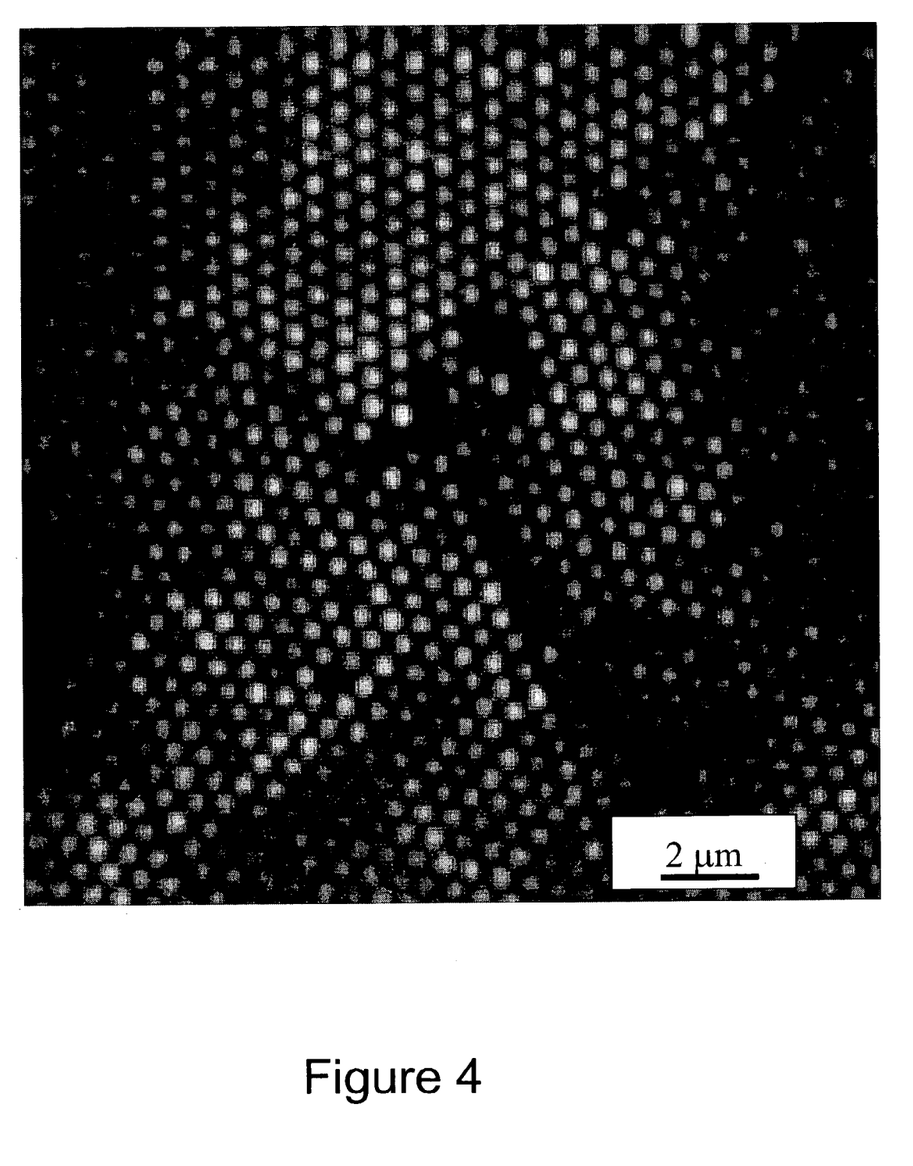
FIG. 4 is an Atomic Force Microscopy image of the nanocomposite material formed from the core-shell particles with conductive polypyrrol cores and poly (butyl acrylate) shells.

Polymer-based Nanocomposite Material Formed from Coreshell Particles with Electroconductive Polymer and Dielectric Shells Conductive monodisperse polypyrrole particles with the dimensions varying 0.08 to 300 μm covered with the dielectric poly (butyl acryalate) shells were synthesized using the recipe given in Table 3. A film formed from polypyrrol particles showed a finite conductivity. When an elastomeric layer comprised of a cross-linked poly (butyl acrylate) was attached to the core particles, a film formed by annealing of the sediment formed by the core-shell particles showed conductivity depending on the thickness of the elastomeric shells. Very small stretching of the film led to significant drop in conductivity. These films can be used for non-destructive control of strains in various materials or be incorporated in micromechanical devices in which thorough control of small displacements is required. FIG. 4 is an Atomic Force Microscopy image of the nanocomposite material formed from the core-shell particles with conductive polypyrrol cores and poly (butyl acrylate) shells.

Figure 5:
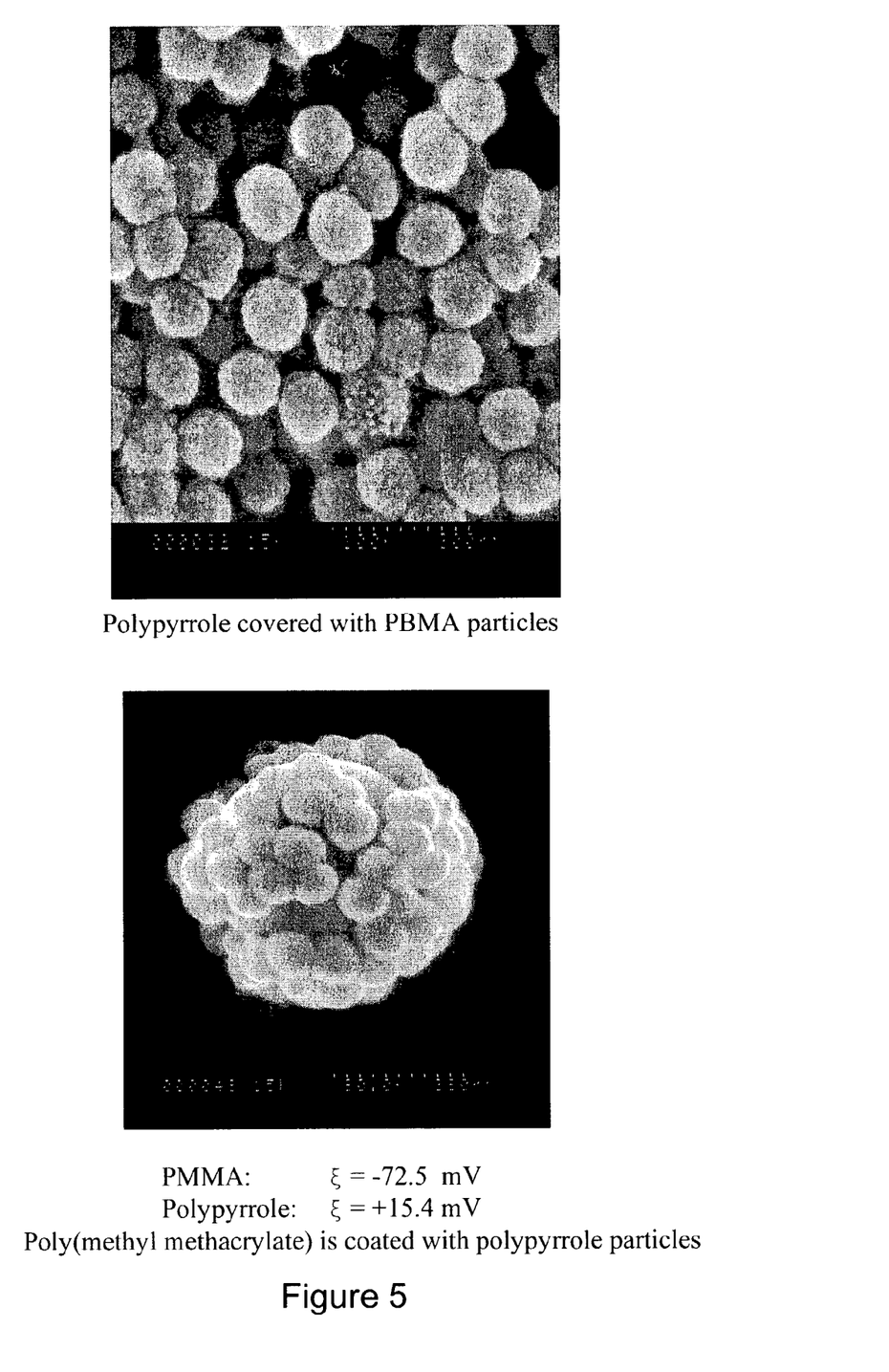
FIG. 5 shows polypyrole cores covered with poly (butyl methacrylate) (PBMA) particles.

The polymeric CFM can be represented by a pure polymer or a polymer which is functionalized by either chemically attached functional groups or mixing it with appropriate low or high-molecular weight species. When the core-shell particles are made from dissimilar materials and the affinity between the core and the shell material is not sufficient to provide adhesion between the cores and the shells, interfacial polymerization is not efficient and the shell-forming polymer was found to nucleate and polymerize in the bulk rather that on the surface of the core particles. In this situation, the attachment of shells was provided by electrostatic attraction between cores and shell-forming particles synthesized from materials carrying opposite charges, as is shown in FIG. 5. After attachment the shell-forming polymer was annealed to form a dense and uniform shell, which could be later transformed into a matrix.

Figure 6:
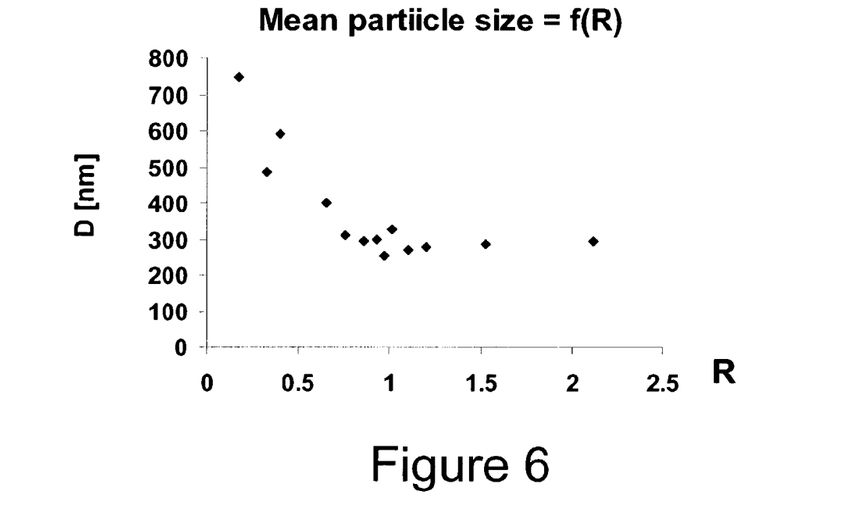
FIG. 6 shows core-shell polypyrrole-poly (butyl methacrylate) particle size as a function of the ratio between the weight concentration of the core- and shell-forming particles.
Figure 7:
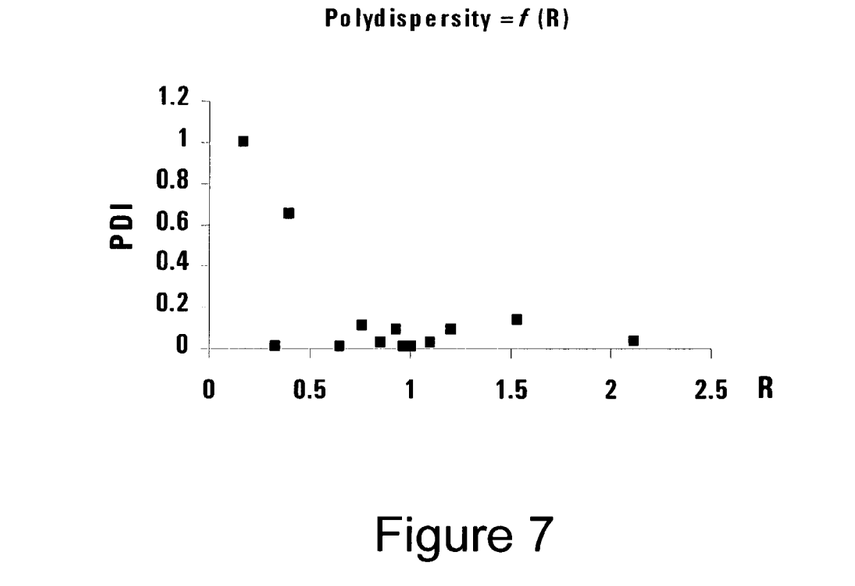
FIG. 7 shows the polydispersity of the core-shell polypyrrole-poly (butyl methacrylate) particles as a function of the ratio between the weight concentration of the core- and shell-forming particles.

The amount of the shell-forming polymer to the core-forming polymer had to provide a dense coverage of the core particles with at least a monolayer of the shell-forming particles. As is shown in FIGS. 6 and 7, only under these conditions core-shell particles with the well-defined size and high monodispersity could be produced after coating the core particles.

EXAMPLE 3

Figure 8:
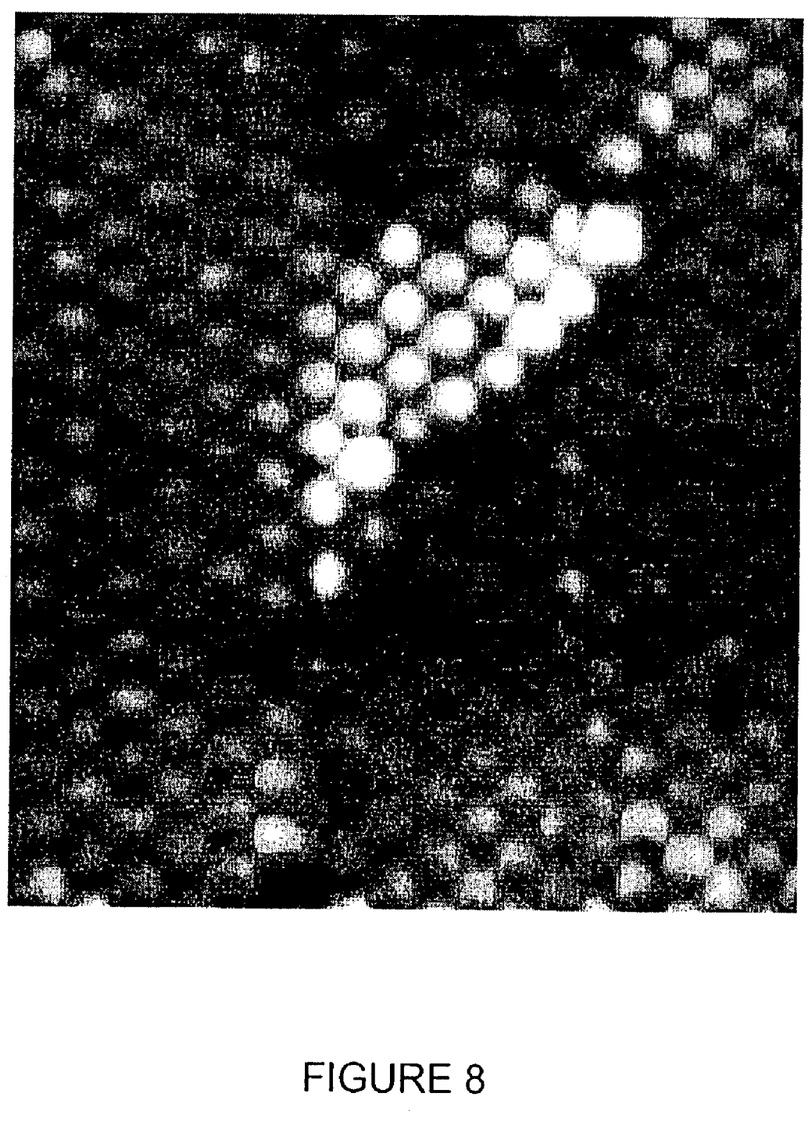
FIG. 8 is an Atomic Force Microscopy image of the nanocomposite material formed from the core-shell particles containing silica cores and poly (methyl methacrylate) shells, the size of silica particles is 0.6 μm.

Polymer Nanocomposites Formed by Inorganic Particles Embedded in a Polymeric Matrix Monodispersed silica particles were synthesized using a recipe shown in Table 4. Poly (methyl methacrylate) shell was attached to the silica particles, and a sediment of the core-shell particles was heated at the temperature leading to flow of PMMA. FIG. 8 shows an Atomic Force Microscopy image of the nanocomposite material formed from the core-shell particles containing silica cores and poly (methyl methacrylate) shells. The size of silica particles is 0.6 μm.

EXAMPLE 4

Figure 9:
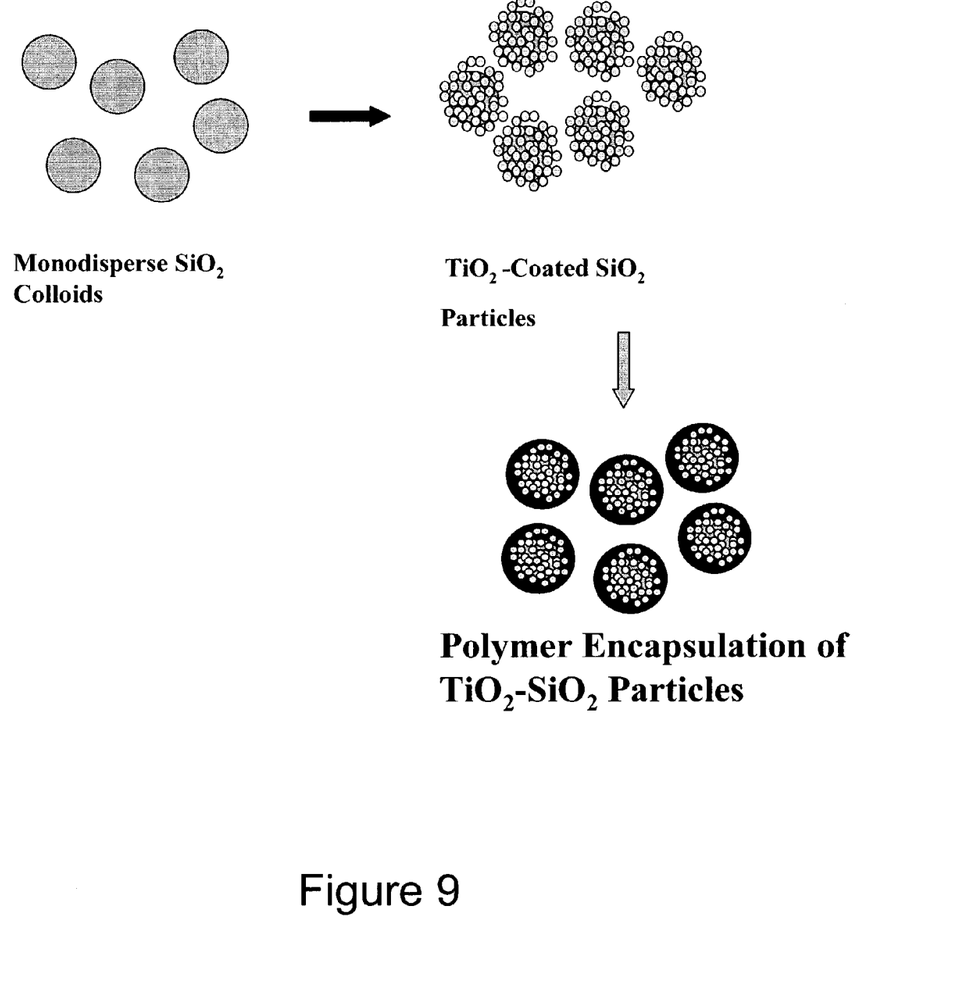
FIG. 9 is a diagrammatic representation of a method of producing multilayer cores by using silica particles as templates and attaching titanyl sulfate or titanium oxide coating to the core particles.
Figure 10:
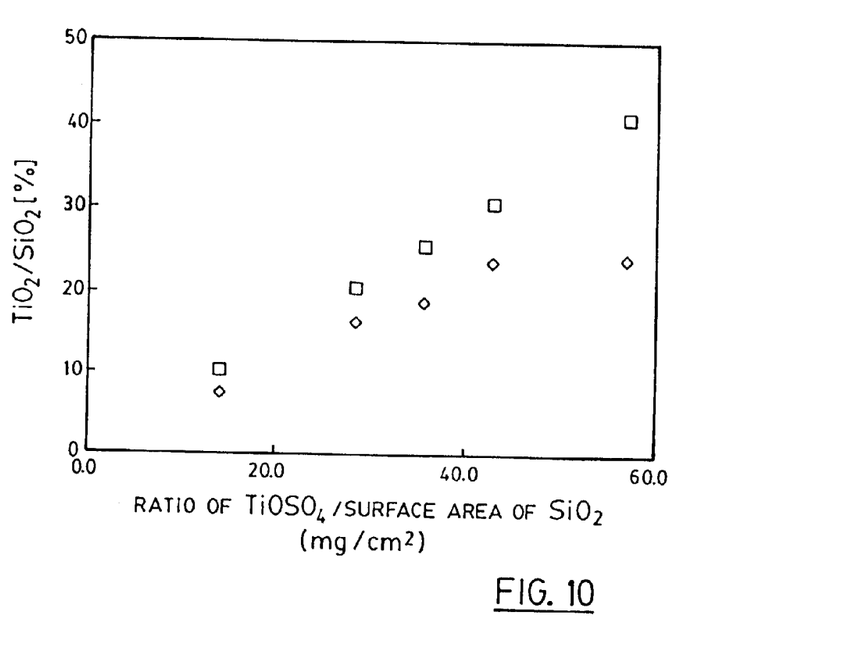
FIG. 10 shows the mass ratio $TiO_2/SiO_2$ in the core shell particles as a function of ratio $TiOSO_4$/surface area of $SiO_2$, squares are the calculated ratio, diamonds are the experimental results obtained by elemental analysis.
Figure 11:
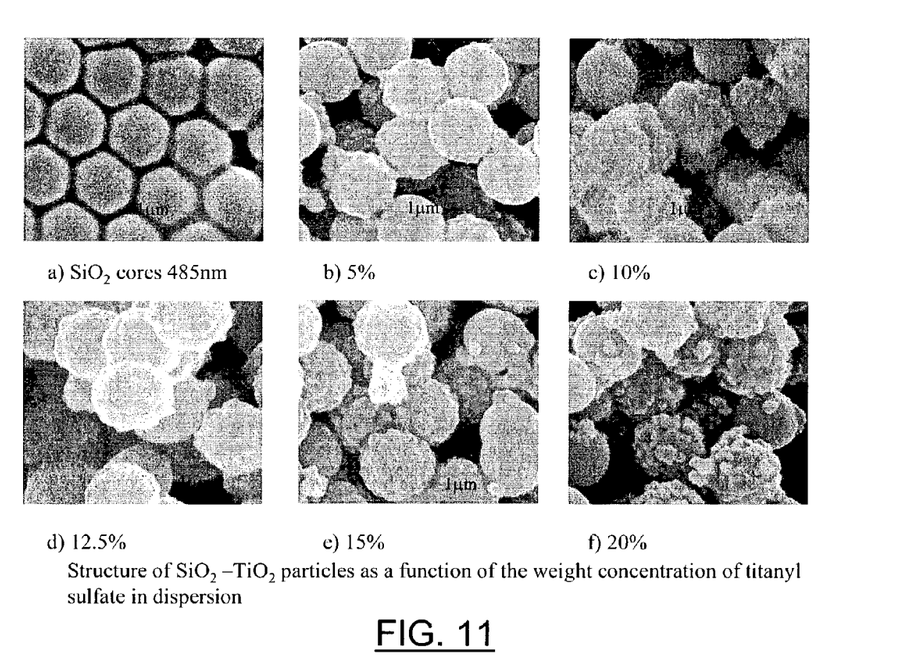
FIG. 11 shows the structure of $SiO_2$ particles as a function of the weight concentration of titanyl sulfate in dispersion.
Figure 12A:
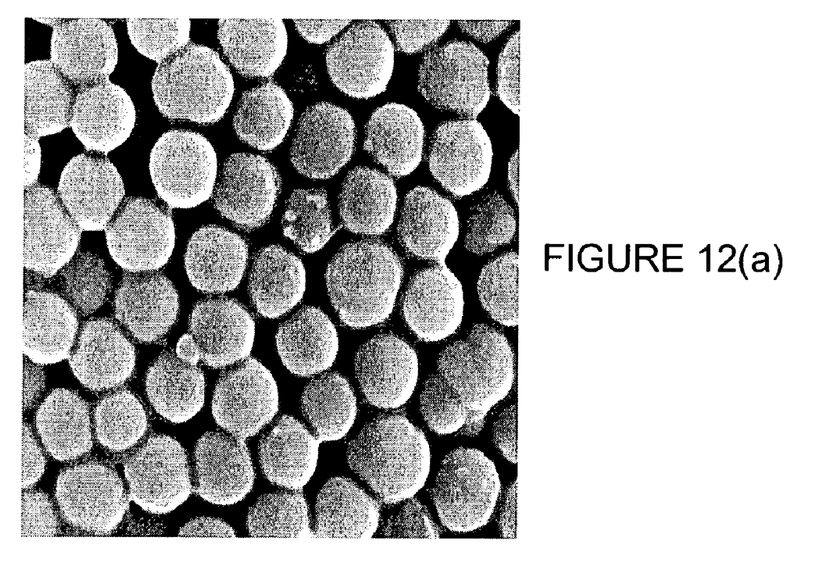
FIG. 12 is a Scanning Electron Microscopy image of the silica particles (a) and silica particles coated with $TiO_2$ shells (b), the size of silica particles is 580 nm, the diameter of the $SiO_2$—$TiO_2$ particles is 0.78 μm.
Figure 12B:
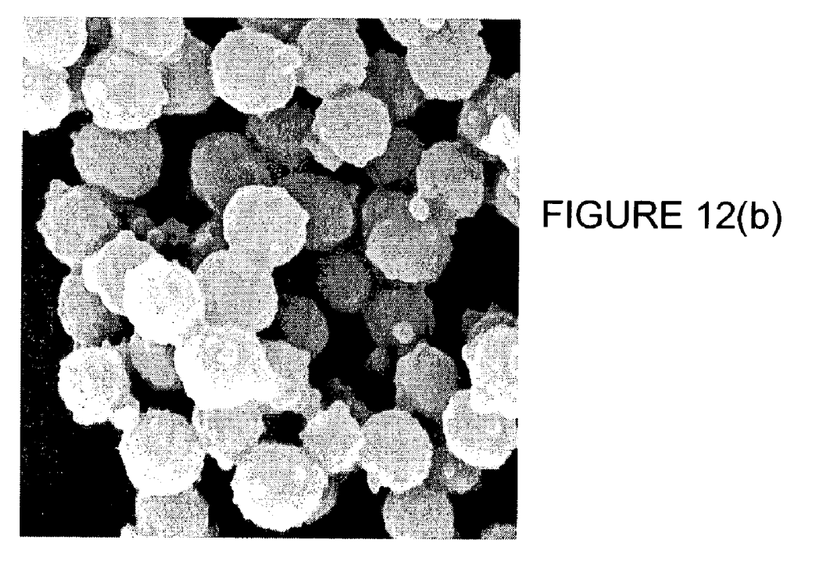
Figure 13:
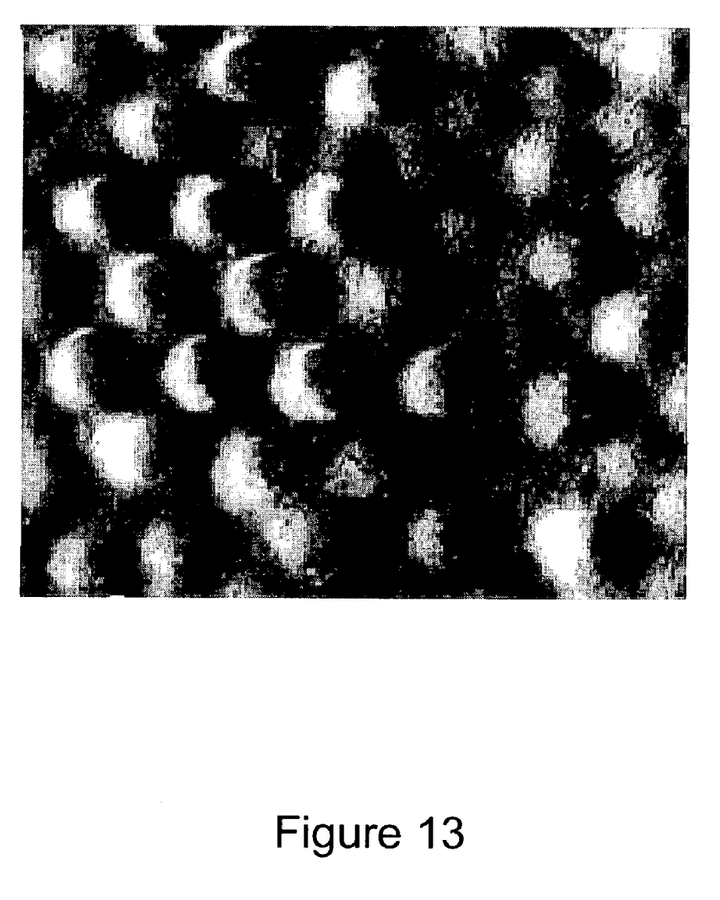
FIG. 13 is an Atomic Force Microscopy image of the nanocomposite material formed from the core-shell particles with $SiO_2$—$TiO_2$ cores and poly (methyl methacrylate) shells.
Figure 14:
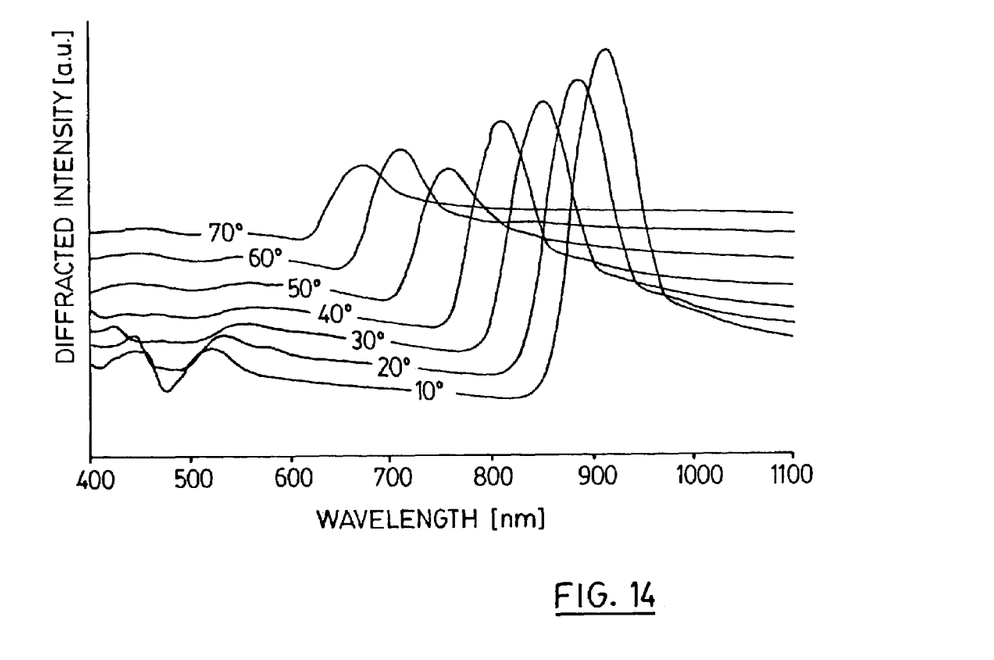
FIG. 14 shows Bragg diffraction patterns of the films formed from the core-shell particles with $SiO_2$—$TiO_2$ cores and poly (methyl methacrylate) shells.

Polymer Nanocomposites Formed by Multicomponent Inorganic Particles Embedded in a Polymeric Matrix Multilayer cores could be produced by using silica particles as templates and attaching titanyl sulfate or titanium oxide coating to the core particles, as is shown in FIG. 9. Monodispersed silica particles were synthesized using a recipe shown in Table 4. A titanium oxide layer was synthesized on the top of silica particles using a recipe shown in Table 5. In general, the volume of $TiO_2$ varied from 0.05 to 0.4 with respect to the volume of the silica particles. Referring to FIG. 10, a very important requirement in the preparation of monodispersed bilayer inorganic cores is the exact ratio between the surface area of silica particles and the amount of titanyl sulfate added to silica dispersion. FIG. 10 shows the mass ratio $TiO_2/SiO_2$ in the core shell particles as a function of ratio $TiOSO_4$/surface area of $SiO_2$. Squares: calculated ratio; diamonds. The experimental results were obtained by elemental analysis. The surface area of silica particles in the system was controlled by either silica particle size, or by their concentration in the dispersion. Referring to FIG. 11 shows the structure of the silica particles (FIG. 11a) and coated silica particles when titanyl sulfate is deficient (FIG. 11b), in optimum ratio (FIGS. 11c and d), and in excess, (FIG. 11f). FIG. 12 is a Scanning Electron Microscopy image of the silica particles (a) and silica particles coated with $TiO_2$ shells (b). The size of silica particles is 580 nm, the diameter of the $SiO_2$—$TiO_2$ particles is 0.78 µm. FIG. 13 shows an Atomic Force Microscopy image of the nanocomposite material formed from the core-shell particles with $SiO_2$—$TiO_2$ cores and poly (methyl methacrylate) shells. Films formed in this manner, showed strong Bragg diffraction patterns, specifically, FIG. 8 shows Bragg diffraction patterns of the films formed from the core-shell particles with $SiO_2$—$TiO_2$ cores and poly (methyl methacrylate) shells.

In such films, the position of the diffraction peak strictly depends on the dimensions of the cores and shells, therefore such films can be used as interference high-refractive index polymer-based coatings for, e.g. security paper. Alternatively, the inorganic particles can be obtained from semiconductors e.g. CdS—CdSe and then coated with a polymeric shell. Upon annealing the quantum dots will be incorporated in the polymeric matrix (quantum dots). Materials exhibiting electroactivity may be incorporated into the voids.

The multicomponent materials of which the cores and/or shells are produced may comprise two or more different materials. For example the cores may be made of two or more several different oxide materials, in layers or a homogenous mixed oxide. The same applies to the polymeric shell materials, the multicomponent shells may be made of two or more polymers in blends, block copolymers and the like.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

TABLE 1

Volume Fraction of the CFP in the Polymer Nanocomposite Formed from Core-Shell Particles with the Different Core Diameter and Shell Thickness.

| $L_s = r_p -$ | | | | | $R_c$, µm | | | | |
|---|---|---|---|---|---|---|---|---|---|
| $r_c$, µm | 0.15 | 0.20 | 0.25 | 0.30 | 0.35 | 0.40 | 0.45 | 0.50 | 0.60 |
| 0.025 | 42 | 52 | 58 | 63 | 67 | 70 | 73 | 75 | 79 |
| 0.050 | 22 | 30 | 36 | 42 | 47 | 51 | 55 | 58 | 63 |
| 0.075 | 12 | 19 | 24 | 30 | 34 | 38 | 42 | 46 | 51 |
| 0.100 | 8 | 12 | 17 | 22 | 26 | 30 | 33 | 36 | 42 |
| 0.125 | 5 | 9 | 12 | 16 | 20 | 23 | 26 | 30 | 35 |
| 0.150 | 4 | 6 | 9 | 13 | 16 | 19 | 22 | 24 | 30 |
| 0.175 | 3 | 5 | 7 | 10 | 12 | 15 | 18 | 20 | 25 |
| 0.20 | 2 | 4 | 6 | 8 | 10 | 12 | 15 | 17 | 22 |
| 0.25 | 1 | 2 | 4 | 5 | 7 | 9 | 10 | 11 | 18 |

TABLE 2

Recipe for the Three-Stage Emulsion Polymerization of the 1050 nm Core-Shell Latex Particles

| | Stage 1 | Stage 2 | Stage 3 |
|---|---|---|---|
| Precharge: | | | |
| Deionized water, g | 70 | 70 | 40 |
| Seeds from previous step, g | — | 20 | 20 |
| Potassium persulfate, g | 0.2 | — | — |
| AIBN, g | — | 0.005 | 0.005 |
| Pumping mixture: | | | |
| MMA, g | 30 | 7 | 2 |
| BMA, g | — | — | 1 |
| DDM, g | 0.088 | 0.052 | 0.136 |
| EGDMA, g | 1.068 | 0.032 | — |
| NBD-MMA, g | 0.01 | 0.0035 | — |
| AIBN, g | — | 0.052 | 0.186 |
| Ionic initiator solution added simultaneously with the monomer mixture: | | | |
| Potassium persulfate, g | — | — | 0.0026 |
| Water, g | — | — | 2.6 |
| Particle size, nm | 500 | 640 | 745 |

TABLE 3

Recipe for the synthesis of the core-shell particles with conductive cores and dielectric shells

| Pyrrole, Ml | $FeCl_3$ g | Stabilizer* g | $H_2O$ ml | butyl acrylate ml | DDM g | $K_2S_2O_4$ g |
|---|---|---|---|---|---|---|
| 0.3–1.0 | 5.47 | 0.3–1.0 | 100 | 2 | 0.13 | 0.1 |

*Hydroxy propyl cellulose, poly (ethylene oxide), poly (vinyl alcohol)

TABLE 4

Recipe for the synthesis of the $SiO_2$

| Tetraethyl Orthosilicate, ml | Ethanol | % $H_2O$ | % $NH_3$ | Total volume, ml | Reaction Time | Particle size |
|---|---|---|---|---|---|---|
| 20 | 234 | 14.4 | 0.84 | 300 | 3 hr | 580 nm |
| 20 | 234 | 13.8 | 1.4 | 300 | 1 hr | 340 nm |
| 20 | 234 | 10.25 | 0.63 | 285 | 6 hr | 120 nm |

TABLE 5

Recipe for the synthesis of the $SiO_2$—$TiO_2$ particles

| Silica particles, with the diameter, nm | Silica solid content, % | Volume 0.2 M $TiOSO_4$ in 1M $H_2SO_4$ ml | Total reaction, volume, ml | Particle size nm |
|---|---|---|---|---|
| 220 | 3.0 | 25 | 225 | 260 |
| 220 | 0.8 | 100 | 400 | 1000 |
| 580 | 1.0 | 40 | 440 | 780 |

Therefore what is claimed is:

1. A nanocomposite material, comprising;
a plurality of rigid core particles embedded in a polymeric shell material and including a plurality of voids located therein, said core particles having a radius $r_c$ and said polymeric shell material coating said core particles having a shell thickness $l_s$, selecting the radius $r_c$ of the rigid spherical core particles and the shell thickness $l_s$ to satisfy $0.05 < l_s/r_c < 0.2$.

2. The nanocomposite material according to claim 1 wherein said core particles and said air voids are periodically disposed throughout said polymeric shell material.

3. The nanocomposite material according to claim 1 wherein said rigid core particles are substantially spherical particles.

4. The nanocomposite material according to claim 1 wherein said rigid core particles comprise multicomponent organic or inorganic materials or single-component materials.

5. The nanocomposite material according to claim 1 wherein said polymeric shell material comprises multicomponent or single-component polymers.

6. The nanocomposite material according to claim 1 wherein said voids are partially or completely filled with a functional material.

7. The nanocomposite material according to claim 6 wherein the functional material is selected from the group consisting of conducting materials, semiconductors, dielectrics, magnetic materials, polymeric materials, optically-sensitive materials and liquid crystal materials.

8. The nanocomposite material according to claim 1 wherein said rigid core particles include an electroconductive polymer and wherein said polymeric material includes a dielectric polymer.

9. The nanocomposite material according to claim 8 wherein said electroconductive polymer comprises electroconductive polypyrrole, and wherein said dielectric polymer comprises cross-linked poly (butyl methacrylate).

10. The nanocomposite material according to claim 8 wherein said rigid core particles comprise multicomponent inorganic oxide spheres.

11. The nanocomposite material according to claim 1 wherein said rigid core particles comprise multicomponent oxide spheres.

12. The nanocomposite material according to claim 11 wherein said multicomponent oxide spheres each include a silica sphere coated with another oxide shell.

13. The nanocomposite material according to claim 12 wherein said other oxide forming said oxide shell is $TiO_2$.

14. The nanocomposite material according to claim 11 wherein said polymer shell material is poly (methyl methacrylate).

15. The nanocomposite material according to claim 7 wherein said optically-sensitive material is a fluorescent dye or chromophore that fluoresces at a first wavelength, including a second fluorescent dye or chromophore that fluoresces at a second wavelength incorporated into said polymeric shell material, and including a third fluorescent dye or chromophore that fluoresces at a third wavelength incorporated into, or bound to, said core particles.

16. The nanocomposite material according to claim 4 wherein said multicomponent core includes two different components.

17. The nanocomposite material according to claim 4 wherein said multicomponent core includes three or more different components.

18. A nanocomposite material, comprising;
a plurality of rigid core particles embedded in a polymeric shell material and including a plurality of voids located therein, said rigid core particles comprising multicomponent organic or inorganic materials, said core particles having a radius $r_c$ and said polymeric shell material coating said core particles having a thickness $l_s$, selecting the radius $r_c$ of the rigid spherical core particles and the shell thickness $l_s$ to satisfy $0.05<l_s/r_c<0.2$.

19. The nanocomposite material according to claim 18 wherein said core particles and said voids are periodically disposed throughout said polymeric shell material.

20. The nanocomposite material according to claim 18 wherein said rigid core particles comprise multicomponent organic materials or multicomponent inorganic materials, or a combination of organic and inorganic materials.

21. The nanocomposite material according to claim 19 wherein said polymeric shell material comprises multicomponent or single-component polymers.

22. The nanocomposite material according to claim 18 wherein said voids are partially or completely filled with a functional material.

23. The nanocomposite material according to claim 21 wherein the functional material is selected from the group consisting of conducting materials, semiconductors, dielectrics, magnetic materials, polymeric materials, optically-sensitive materials and liquid crystal materials.

24. A method of synthesizing a nanocomposite material having voids, comprising;
coating a plurality of core particles with a polymeric shell material, said core particles having a radius $r_c$ and said polymeric shell material coating said core particles having a shell thickness $l_s$, selecting the radius $r_c$ of the core particles and the shell thickness $l_s$ to satisfy $0.05<l_s/r_c<0.2$, said polymeric shell material having a glass transition temperature above room temperature, the core particles having softening temperature greater than a softening temperature of said polymeric shell material such that upon annealing the polymeric shell material softens and flows while the core remains solid;
producing one of a one-dimensional, two-dimensional and three-dimensional array with the coated core particles; and
heating said array above the softening temperature of the polymeric shell material at which it flows to form a continuous phase having air voids dispersed therethrough.

25. The method according to claim 24 wherein said array is grown using sedimentation, electrodeposition, centrifugation, or water filtration.

26. The nanocomposite material according to claim 24 wherein said core comprises multicomponent organic or inorganic materials or single-component materials.

27. The nanocomposite material according to claim 24 wherein said polymeric shell material comprises multicomponent or single-component polymers.

28. The method according to claim 24 wherein a functional material is infiltrated into said voids.

29. The method according to claim 28 wherein said functional materials is infiltrated into said voids by one of capillary infiltration, diffusion, electrochemical deposition and vacuum vapor deposition.

30. The nanocomposite material according to claim 1 wherein said core particles have an aspect ratio greater than unity.

31. The nanocomposite material according to claim 24 wherein said core particles are substantially spherical particles.

32. The nanocomposite material according to claim 24 wherein said core particles have an aspect ratio greater than unity.

33. A nanocomposite material comprising a plurality of core particles embedded in a polymeric material and including a plurality of voids located therein, produced by a method comprising the steps of:

coating a plurality of rigid core particles with a polymeric shell material, said core particles having a radius $r_c$ and said polymeric shell material coating said core particles having a shell thickness $l_s$, selecting the radius $r_c$ of the rigid core particles and the shell thickness $l_s$ to satisfy $0.05 < l_s/r_c < 0.2$, said polymeric shell material having a glass transition temperature above room temperature, the rigid core particles having softening temperature greater than a softening temperature of said polymeric shell material such that upon annealing the polymeric shell material softens and flows while the rigid core remains solid;

producing one of a one-dimensional, two-dimensional and three-dimensional array with the coated rigid core particles; and heating said array above the softening temperature of the polymeric material at which it flows to form a continuous phase having air voids dispersed therethrough.

34. The nanocomposite material according to claim 33 wherein said rigid core particles are substantially spherical particles.

35. The nanocomposite material according to claim 33 wherein said rigid core particles have an aspect ratio greater than unity.

36. The nanocomposite material according to claim 33 wherein said array is grown using sedimentation, electrodeposition, centrifugation, or water filtration.

37. The nanocomposite material according to claim 33 wherein said rigid core comprises multicomponent organic or inorganic materials or single-component materials.

38. The nanocomposite material according to claim 33 wherein said polymeric shell comprises multicomponent or single-component polymers.

39. The nanocomposite material according to claim 33 wherein a functional material is infiltrated into said voids.

40. The nanocomposite according to claim 39 wherein said functional material is infiltrated into said voids by one of capillary infiltration, diffusion, electrochemical deposition and vacuum vapor deposition.

* * * * *